United States Patent [19]

Eng et al.

[11] 4,302,838

[45] Nov. 24, 1981

[54] APPARATUS FOR SYNCHRONIZING AN INPUT SIGNAL WITH A TIME MULTIPLEXED SIGNAL

[75] Inventors: Kai Y. Eng, Parlin; Barin G. Haskell, Tinton Falls, both of N.J.

[73] Assignee: Bell Telephone Laboratories, Incorporated, Murray Hill, N.J.

[21] Appl. No.: 126,401

[22] Filed: Mar. 3, 1980

[51] Int. Cl.³ .............................................. H04J 3/06
[52] U.S. Cl. .................................................. 370/100
[58] Field of Search ............... 370/100, 105, 108, 109, 370/10, 50; 375/106, 111, 110; 371/42, 47; 358/148

[56] References Cited

U.S. PATENT DOCUMENTS 3,697,682  10/1972  Berg .

OTHER PUBLICATIONS

"The Theory and Design of Chirp Radars", Klauder et al., Bell Syst. Tech. Jour., vol. 39, No. 4, Jul. 1960, pp. 754-808.
"Time-Compression-Multiplex Transmission", Flood et al., Proc. IEE, vol. 111, No. 4, pp. 647-668.
"The Design and Application of Highly Dispersive Acoustic Surface-Wave Filters", Gerard et al., IEEE Trans'ns., vol. MTT-21, No. 4, 4/73, pp. 176-186.
"Modern Radar Pulse Compression Techniques", Bristol, NEREM, 74 Record, vol. 16, Oct. 1974, pp. 65-72.

Primary Examiner—Thomas A. Robinson
Attorney, Agent, or Firm—Richard J. Roddy

[57] ABSTRACT

Bandwidth is a precious resource in a communication system. High frequency signals, for example, video signals, typically require a relatively large bandwidth. One means for reducing bandwidth is by way of time compression multiplexing wherein signals may be stored a short period of time, compressed in time and then transmitted over a communication path. The subject signal processor may time compress and time synchronize an input signal with a time multiplexed signal. In a first arrangement, responsive to a time delay difference between the signals (215), a first frequency signal (220) is used to modulate (230) the input signal (210). The modulated signal is extended through a dispersive filter (260) for introducing a delay to the input signal, the delay for synchronizing same with the time multiplexed signal. The synchronized output of the dispersive filter may be extracted by an envelope detector (270) for extension to an output terminal (280). In a second arrangement, the input signal may be modulated by a variable chirp signal (220). The modulated (230) input signal is then extended through a dispersive filter (260) and an envelope detector (270) for jointly time compressing and time synchronizing the input signal with the time multiplexed signal.

6 Claims, 3 Drawing Figures

APPARATUS FOR SYNCHRONIZING AN INPUT SIGNAL WITH A TIME MULTIPLEXED SIGNAL

Technical Field

This invention relates to signal processing and, more particularly, to a signal processor for synchronizing an input signal with a time multiplexed signal.

BACKGROUND OF THE INVENTION

One common communication medium employs frequency division multiplexing.

In frequency division multiplexing, a signal from an input channel is usually shifted in frequency by a transmitter modulator. The shifted signal then occupies a different portion of the frequency band, the band having been allocated for transmitting signals over a communication path between the transmitter and a receiver. For example, U.S. Pat. No. 3,697,682; issued Oct. 10, 1972 and entitled "Video Signal Processing"; discloses a method and apparatus according to which fields of a video frame are frequency interleaved. Each frame comprises a succession of P fields. Each field represents a different group of scan lines and thus each field includes a plurality of scan lines. Also, each field is of equal field scan time duration $T_f$. In scanning a frame, each field of the frame is delayed by a time equal to the scan time $T_f$ multiplied by a factor $(p-i)$ where i represents the ordinal place of the field in the succesion of fields which comprise the frame, i.e., $i = 1, 2, \ldots, P$. Thus, the first field of the frame is delayed a time $T_f$ multiplied by $(P-1)$ while each succeeding field of the frame is delayed for a delay time equal to the delay time of the preceding field less the time of one field scan. Thereby, the respective fields coexist in time. Thereafter, each of the P fields is frequency shifted by a sinusoid having a frequency for shifting each field a different submultiple of the scan line frequency. As a result, the bandwidth of the resultant frequency multiplexed signal is essentially the same as that of the original video signal.

Another common communication medium employs time division multiplexing.

In time division multiplexing, the signal from an input channel modulates a train of pulses that are interleaved with the pulse trains of other channels. For example, the Bell System T1 carrier system interleaves an input signal from each of 24 input channels in a respective one of 24 time slots of a resultant 1.544 megabits per second time multiplexed signal. With such pulse code modulated (PCM) TDM arrangements as the T1 system, it is common for each time slot to include a digital representation of an analog input signal, the analog signal having been properly quantized according to some encoding law. However, it should be clear that a signal other than a quantized analog signal may be inserted in a time slot.

Thus, in frequency division multiplexing, the signal from each channel uses only a fraction of the bandwidth of the communication path but occupies the bandwidth all of the time. On the other hand, in time division multiplexing, the signal from each channel occupies the communication path only for a fraction of the time, i.e., during its time slot, but during that fraction of time the whole bandwidth is available to the signal.

Another form of multiplexing is called time compression multiplexing.

In time compression multiplexing, the signal from each input channel is stored for a short period of time. The signals from all channels are then read from the store, compressed in time and transmitted over the communication path. See, for example, the concurrently filed application of B. G. Haskell, Ser. No. 126,422 "Time Compression Multiplexing of Video Signals" in which a signal processor for time compressing video signals is disclosed. The signal processor includes a plurality, e.g., N, of input terminals, each input terminal adapted to receive a video signal $v_i(t)$, the video signal including a plurality of scan lines, and a scan line having a predetermined time duration, e.g., T seconds. The signal processor time compresses the video signal from a scan line time interval $(O, T)$ by a predetermined compression factor M, e.g., $M = N$, to a time interval $(O, T/N)$. Or the signal processor compresses the video signal $v_i(t)$ from the i-th input terminal, $i = 1, 2, \ldots, N$, to a time interval $$\left( \frac{(i-1)T}{N}, \frac{iT}{N} \right).$$

There are N such intervals in the scan line interval $(O, T)$. More specifically, the signal processor for time compressing the video signal includes apparatus for modulating the video signal and for extending the modulated signal through a respective first, predetermined delay network and, after adding delayed signals, for introducing a second, variable delay to the sum of the modulated signals whereby a time compressed video signal obtains. The modulated signal obtains by multiplying the video signal with a chirp signal. The second, variable delay obtains by extending the modulated signal through a dispersive filter. The time compressed video signal obtains by being extracted from the dispersive filter output by an envelope detector and being extended to a receiver where the compressed signal is expanded.

However, in time multiplexing the compressed signal, the compressed signal may need to be synchronized with an appropriate time slot before being extended to the receiver.

SUMMARY OF THE INVENTION

This and other problems are solved in accord with the principles of our invention by an improved signal processor for synchronizing a processor input signal with a time multiplexed signal. According to one aspect of our invention, a delay control signal for identifying a determinable relationship, for example, the time difference between the input signal and the multiplexed signal, is extended to an input of a first frequency generator. The input signal may be modulated, for example, by way of a multiplier, with the first frequency signal. The modulated signal may be delayed, for example, by way of a dispersive filter, a time equal to the time difference between the input signal and the multiplexed signal. The input signal may be extracted from the modulated and delayed signal, for example, by way of an envelope detector, and extended to an output terminal in synchronization with the time multiplexed signal. According to a second aspect of our invention, the input signal may be time compressed and time synchronized with the multiplexed signal for extension to the output terminal. An illustrative embodiment of the joint compression and synchronization arrangement employs a third variable frequency signal, for example, a linear chirp signal, for modulating the input signal.

BRIEF DESCRIPTION OF THE DRAWING

Our invention should become fully apparent when taken in connection with the following detailed description and the accompanying drawing in which.

DETAILED DESCRIPTION

Figure 1:
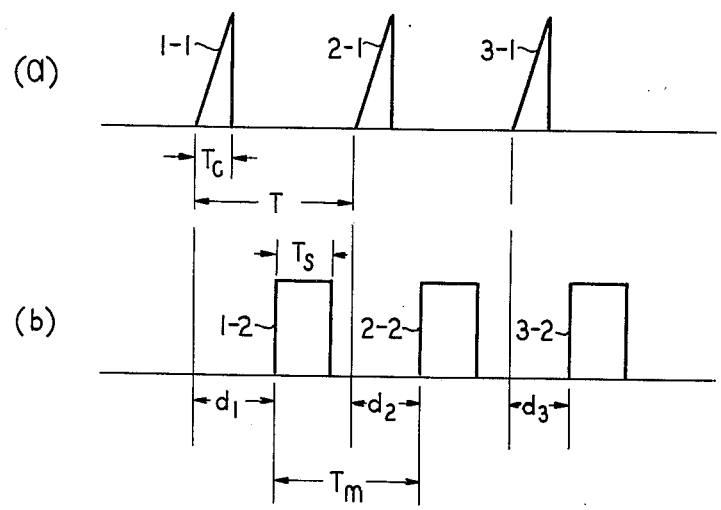
FIG. 1 illustrates a timing relationship among time compression and time multiplexed signals, the relationship being useful in describing the signal processor apparatus illustrated in FIG. 2.

Referring to FIG. 1(a), an input signal, illustratively an input signal $v_i(t)$, may be compressed in time according to a predetermined compression factor M from a scan line duration of T seconds to a time compressed duration of $T_c$ (=T/M) seconds by way of a signal processor of the type disclosed in the aforementioned concurrently filed application. A plurality, e.g., 1-1, 2-1, 3-1, of such time compressed durations are there illustrated. Here as there, we assume for convenience that the predetermined compression factor M is equal to the number of input terminals N, i.e., M=N. The time compressed input signal may thereafter be inserted into a predetermined time slot of a time multiplexed signal.

Referring to FIG. 1(b), a time multiplexed signal of time period $T_m$ typically includes a plurality of time slots, one time slot of duration $T_s$ seconds, i.e., 1-2, 2-2, 3-2, being there illustrated for each of three time periods. In a soon to be described illustrative embodiment of the principles of our invention, the time compressed duration $T_c$ is assumed not to exceed the time slot duration $T_s$, i.e., $T_c \leq T_s$. Also, the multiplexed signal period $T_m$ is assumed not to exceed the scan line time duration T, i.e., $T_m \leq T$. An overall relationship among the aforedefined time durations is: $T_c \leq T_s \leq T_m \leq T$. The assumptions as to the time relationships are not by way of limitation of the principles of our invention, rather the assumptions allow for a more concise and easier description of an illustrative embodiment of the principles of our invention. If different relationships were assumed, it would be clear to the skilled art worker employing the principles of our invention that some preprocessing of the signals could occur prior to synchronizing the compressed signal and the multiplexed signal.

It is apparent that a first time compressed signal may be (1) delayed a time $d_1$ seconds, for aligning compressed time duration 1-1 with time slot 1-2 of a first period of the time multiplexed signal and (2) inserted therein. It is equally apparent that a second time compressed signal may be (1) delayed a time $d_2$ seconds for aligning compressed time duration 2-1 time slot 2-2 of a second period of the time multiplexed signal and (2) inserted therein. In general the delay relationship is:

$$d_{j+1} + T = d_j + T_m, \text{ or} \\ d_{j+1} = d_j + (T_m - T); j = 1, 2, \ldots \quad \bigg\} \quad (1)$$

It may be noted that, since $T_m \leq T$, a succeeding delay may be less than its preceding delay, i.e., $d_{j=1} \leq d_j$. If a succeeding delay were negative, the time compressed signal would have arrived for insertion at a point in time, which is later than the point in time at which the multiplex time slot arrived. In such an event, the compressed signal could skip, i.e., would not be inserted in, the time slot of the them time period and would be delayed for insertion in a multiplex time slot of a next succeeding time period.

In light of the above, two cases are useful in describing the principles of our invention. In case one, the time multiplexed period $T_m$ equals the scan line time duration T, i.e., $T_m = T$. In case two, the time multiplexed signal period $T_m$ is less than the scan line time duration T, i.e., $T_m < T$.

Figure 2:
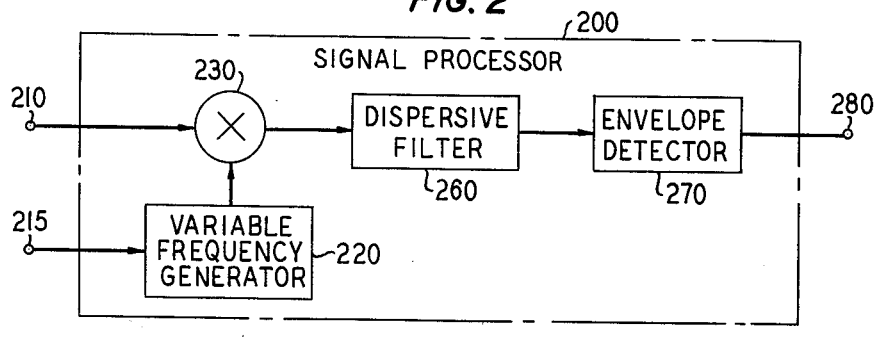
FIG. 2 illustrates signal processor apparatus for synchronizing an input signal with a time multiplexed signal in accord with the principles of our invention.

As to case one with $T_m = T$, it is clear from equation (1) that $d_{j+1} = d_j$. Hence once the signals are synchronized the time compressed signal and the time multiplexed signal would thereafter remain synchronized with respect to each other. Signal processor apparatus, which delays the time compressed signal a delay time duration d ($=d_j$) seconds, for synchronizing the signal is illustrated in FIG. 2.

Broadly, and in accord with one aspect of our invention, an input signal, for example but not necessarily a time compressed video signal $v_i(t)$, is extended from input terminal 210 of signal processor 200 to a first input of modulating multiplier 230. A delay control signal, which identifies a determinable relationship, here the synchronizing delay time duration d, is extended from input terminal 215 to an input of variable frequency generator 220. Responsive to the delay control signal, generator 220 extends a sinusoidal modulating signal of first frequency $f_o$ and phase $\phi(t) = 2\pi f_o t$ to a second input of multiplier 230. A modulated signal output of multiplier 230 is extended to an input of dispersive filter 260 for introducing the appropriate synchronizing delay time d to the input signal.

Figure 3:
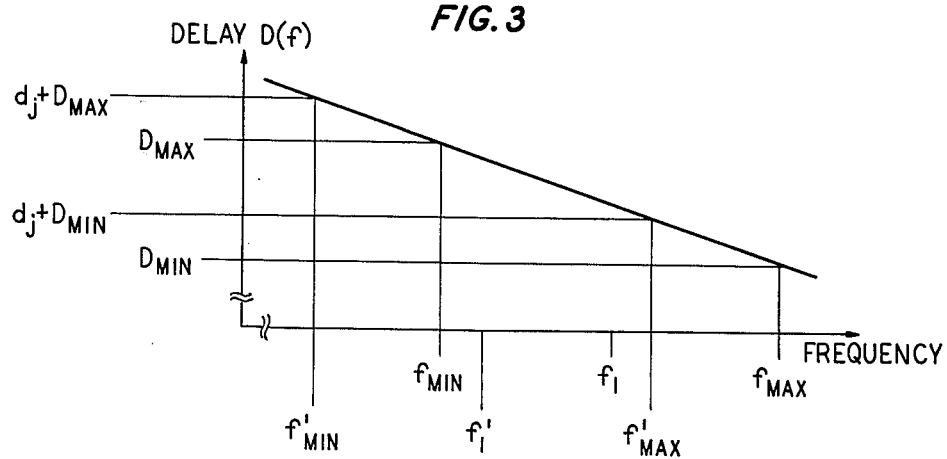
FIG. 3 illustrates a linear delay versus frequency characteristic of a dispersive filter useable in the signal processor illustrated in FIG. 2.

As to dispersive filter 260, FIG. 3 illustrates a typical linear delay versus frequency characteristic of a dispersive filter. In our illustrative embodiment, the dispersive filter is assumed to have a linear delay D(f) versus frequency f characteristic of the form $$D(f) = D_{max} - \frac{D_{max} - D_{min}}{f_{max} - f_{min}} (f - f_{min}) \quad (2)$$

where $D_{min}$ and $D_{max}$ define a minimum and a maximum delay, respectively, and hence a first delay interval ($D_{min}, D_{max}$) over a first frequency interval ($f_{min}, f_{max}$) with center frequency $f_1$. It should be clear from FIG. 1 that a maximum delay $D_{max}$ of T seconds and a minimum delay $D_{min}$ of zero seconds and hence a first delay interval (O, T) would be convenient for synchronizing the signals. For notational convenience, let the following symbol definitions be used:

$$D = D_{max} - D_{min} \\ F = f_{max} - f_{min} \quad \bigg\} \quad (3)$$

Now consider the output $m_i(t)$ of multiplier 230, the output being coupled to an input of dispersive filter 260. The modulated signal output $m_i(t)$ of multiplier 230 may be represented as:

$$m_i(t) = v_i(t) \cos \phi(t) \quad (4)$$

Inasmuch as a dispersive filter introduces a delay to its input signal, the amount of delay being related to the frequency $f_o$ of its input signal, it is clear that a delay $D(f_o) = d$ will be introduced or imparted to signal $m_i(t)$. Accordingly, the output of the dispersive filter occurs at a time $t_d$, time $t_d$ occurring $D(f_o)$ seconds after the time $t_o$ that $m_i(t_o)$ is detected at the dispersive filter input i.e., $$t_d = t_o + D(f_o), \text{ or} \tag{5}$$
$$t_d = t_o + d$$

Hence, responsive to a modulating signal of first frequency $f_o$ from generator 220, dispersive filter 260 introduces the appropriate synchronizing delay time d to the time compressed signal.

Further, generator 220 may be straightforwardly implemented for providing the modulating signal of first frequency $f_o$ using apparatus for supplying a unit amplitude sinusoid. More specifically, generator 220 may be implemented using the linear relationship illustrated in FIG. 3. Referring to FIG. 3, it should be clear that a modulating signal of first frequency $f_o$ from the first frequency interval ($f_{min}$,$f_{max}$) can readily be provided, responsive to an expected synchronizing time delay d where d is from the first delay interval ($D_{min}$,$D_{max}$). Therefore, generator 220 may be implemented using, for example, a voltage controlled oscillator and/or a local oscillator operative responsive to the delay control signal for providing a sinusoidal signal of first frequency $f_o$ for modulating through multiplier 230 input signal $v_i(t)$ whereby dispersive filter 260 introduces the required delay d.

An output of dispersive filter 260 is extended through envelope detector 270 onward to output terminal 280 as the synchronized input signal. As to envelope detector 270, envelope detectors are well known in the art. A synchronous detector could equally replace envelope detector 270. In either case, assume the highest frequency of input signal $v_i(t)$ is substantially less than modulating frequency $f_o$. For example, assume that the highest frequency of signal $v_i(t)$ is in the order of several megahertz. Assume further that first frequency $f_o$ is in the order of several hundred megahertz. In such a case, $m_i(t)$ resembles an amplitude-modulated (AM) signal with a carrier frequency equalling the modulating signal frequency $f_o$ and with an envelope being the input signal $v_i(t)$. Inasmuch as the output of dispersive filter 260 is extended to an input of envelope detector 270, an output of detector 270 is the input signal. Thereby, the input signal has been synchronized to the time multiplexed signal.

In accord with a second aspect of our invention, an input signal may be concurrently time compressed and time synchronized.

From the foregoing, it may be clear that the dispersive filter characteristic represented by equation (2) and illustrated in FIG. 3 contemplates $D_{min}$ and $D_{max}$ as well as $f_{min}$ and $f_{max}$ being predetermined values.

However, on the one hand, in time compression, as is disclosed in the aforecited concurrently filed application, the structural parallel of our generator 220 extends a sinusoidal modulating signal having a second, linear chirp frequency $f_c$ to the second input of the structural parallel of our multiplier 230. Specifically, the modulating signal includes a second, linear chirp frequency $f_c$ from a second frequency interval ($f_{min}$,$f_{max}$).

As to chirp signal, chirp signals are commonly found in the radar art. See, for example, the publication by J. R. Klauder et al, "The Theory and Design of Chirp Radars", *The Bell System Technical Journal*, Vol. 39, No. 4, (July 1960), pp. 745–808. Common chirp signals are frequency modulated (FM) signals and include a frequency which varies linearly with time. More specifically, over a line scan time interval (O, T), our illustrative linear FM chirp signal is assumed to have a chirp frequency $f_c$ where:

$$f_c = f_{min} + \frac{f_{max} - f_{min}}{T} t \tag{6}$$

and where $f_{min}$ and $f_{max}$ define a minimum and a maximum frequency, respectively, and hence the second frequency interval ($f_{min}$,$f_{max}$) over which the chirp signal frequency $f_c$ is linear. Further, the phase $\phi(t)$ of our chirp signal is given by the time integral of $f_c$ or:

$$\phi(t) = f_{min} t + \frac{f_{max} - f_{min}}{2T} t^2 \tag{7}$$

Of course, over the second frequency interval, a second delay interval ($D_{min}$,$D_{max}$) which is consistent with equation (2), would obtain.

On the other hand, in synchronizing, as is aforedescribed, our generator 220 extends a sinusoidal modulating signal having a first frequency $f_o$ to the second input of multiplier 230. The first frequency $f_o$ is from the first frequency interval ($f_{min}$,$f_{max}$). The first frequency is determined responsive to the synchronizing delay time d requirements. Thereafter, responsive to first frequency $f_o$, dispersive filter 260 introduces the synchronizing delay d. That is, unlike the second, chirp frequency $f_c$, first frequency $f_o$ does not typically vary with time but rather varies with synchronizing delay needs. Also, the first and second frequency intervals are typically different.

According to this second aspect of our invention, the apparent obstacles created by these and other differences are overcome to the result that our illustrative signal processor 200 concurrently time compresses and time synchronizes the input signal.

From the foregoing, two delays are evident. A first delay occurs by way of an imaginary first dispersive filter, the filter input being input signal $v_i(t)$ modulated with the first frequency $f_o$ signal for time synchronizing the input signal. A second delay occurs by way of an imaginary second dispersive filter, the filter input being input signal $v_i(t)$ modulated with the second, chirp frequency $f_c$ signal for time compressing the input signal. The first and second dispersive filter functions can be linearly combined for concurrently time synchronizing and time compressing the signals. That is, according to the principles of our invention, the synchronizing delay time d ($=D(f_o)$) and the compression delay time $D(f_c)$ may be algebraically added thereby defining a third, dynamic delay interval ($d_j+D_{min}$,$d_j+D_{max}$), as illustrated in FIG. 3 and hence over a third dynamic frequency interval ($f_{min}$,$f_{max}$) with center frequency $f_1$. Too, generator 220 provides a third, linear chirp signal over the third dynamic frequency interval ($f_{min}$,$f_{max}$), which corresponds to the third dynamic delay interval. Still more specifically, responsive to a delay control signal extended from input terminal 215, generator 220 provides a variable chirp signal of frequency $f_c$ over the third dynamic frequency interval, i.e., $$f_c = f_{min} + \frac{f_{max} - f_{min}}{T} t \tag{8}$$

It should be noted that the second chirp frequency range F ($=f_{max},-f_{min}$), is equal to the third chirp frequency range F($=f_{max},-f_{min}$). Only the absolute frequency values change. Thereby an input signal $v_i(t)$ is concurrently time compressed and time synchronized with the time multiplexed signal.

As to case two with $T_m<T$, it is clear from equation (1) that $d_{j+1}<d_j$. Hence, even though the signals are synchronized in one period, the time compressed signal and the time multiplexed signal would not remain synchronized unless an adjustment were subsequently made. Notwithstanding, case two may be embodied substantially identical to case one, i.e., the delay control signal extended to terminal 215 is adjusted according to equation (1) on a period of period basis. Alternatively, generator 220 could be readily amended to incorporate equation (1).

Although our invention has been described and illustrated in detail, it is to be understood that the same is by way of illustration and example only. Accordingly, various modifications will occur to those skilled in the art and the invention is not to be considered limited by the embodiment shown for purposes of disclosure. Thus, the spirit and scope of the invention are limited only by the appended claims.

We claim:

1. A signal processor including an input terminal (210) adapted to receive an input signal, means for synchronizing said input signal with a time multiplexed signal, and means for extending said synchronized input signal to an output terminal (280) and characterized in that said signal processor further comprises:

means (220) responsive to a delay control signal, said control signal extended from a control terminal (215) for identifying a determinable relationship between said input signal and said multiplexed signal, for providing a signal of first frequency;

means (230) for modulating said input signal with said first frequency signal;

means (260) responsive to said modulated signal for introducing a first delay to said modulated signal; and means (270) responsive to said delay introduced signal for extracting said input signal and for extending said input signal to said output terminal whereby said input signal is synchronized to said multiplexed signal.

2. The signal processor defined in claim 1 wherein said signal modulating means includes:

multiplier means (230) responsive to said input signal and to said first frequency signal for providing said modulated signal.

3. A signal processor defined in claim 1 wherein said first delay introducing means includes a dispersive filter.

4. A signal processor including an input terminal (210) adapted to receive an input signal, means for compressing said input signal, and means for extending said compressed input signal to an output terminal (280) and characterized in that said signal processor further comprises:

means (200) for time compressing said input signal and for synchronizing said compressed signal with a time multiplexed signal, said compressing and synchronizing means including means (220) responsive to a delay control signal detected at a control terminal (215) for providing a third, variable frequency signal, means (230) for modulating said input signal with said variable frequency signal;

means (260) responsive to said modulated signal for introducing a third, variable delay to said modulated signal; and means (270) responsive to said delay introduced signal for extracting a time compressed replica of said input signal and for extending said replica to said output terminal, said replica being synchronized to said time multiplexed signal.

5. The signal processor defined in claim 4 wherein said variable frequency signal providing means includes a chirp signal source and wherein said signal modulating means includes multiplier means (230) responsive to said input signal and to said variable frequency chirp signal for providing said modulated signal.

6. The signal processor defined in claim 4 wherein said variable delay introducing means includes a dispersive filter.

* * * * *